UNITED STATES PATENT OFFICE.

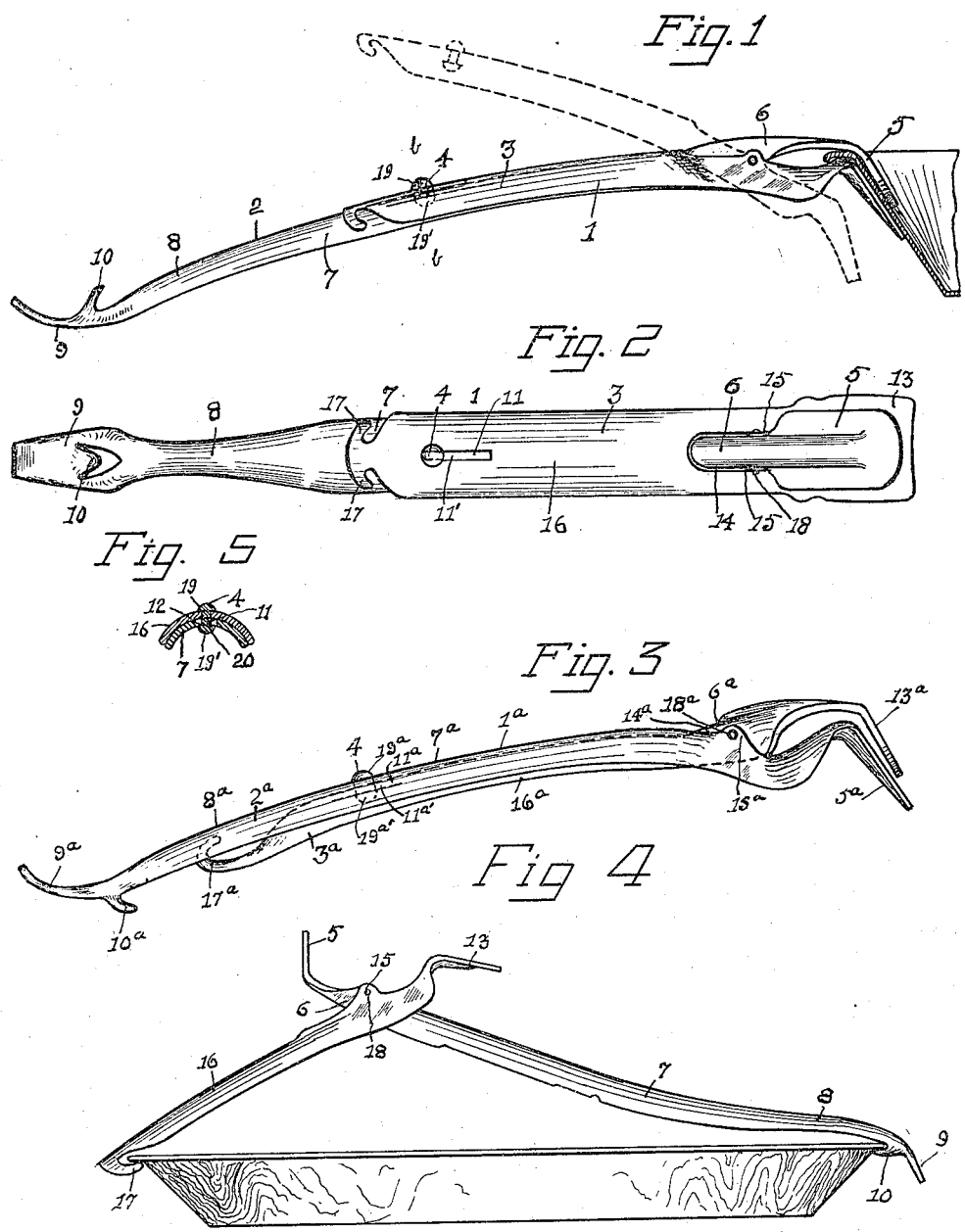

JOHN J. DUKET, OF TOLEDO, OHIO.

PAN-HANDLE AND PAN-LIFTER.

1,145,060. Specification of Letters Patent. Patented July 6, 1915.

Application filed May 21, 1914. Serial No. 839,926.

*To all whom it may concern:*

Be it known that I, JOHN J. DUKET, a citizen of the United States, residing at Toledo, in the county of Lucas and State of Ohio, have invented new and useful Improvements in Pan-Handles and Pan-Lifters, of which the following is a specification.

My invention relates to a combined pan handle and a pan lifter, and has for its object to provide a convenient implement of the kind that is adapted to be readily attached as a handle to and detached from a pan or similar vessel, and that is also adapted as a lifter to engage and lift a pie pan or the like, without coming in contact with the contents of the pan, and that is also adapted to be conveniently used as a stove lid lifter. I accomplish these objects by the construction and combination of parts, as hereinafter described and illustrated in the drawings, in which—

Figure 1 is a side view of a combined handle and lifter, embodying my invention and detachably secured as a handle to the rim portion of a pan. Fig. 2 is a top view of the same. Fig. 3 is a side view of a modified form of handle and lifter embodying my invention. Fig. 4 shows the handle and lifter illustrated in Fig. 1 applied as a pan lifter, and Fig. 5 is a cross section on line b—b of the handle and lifter shown in Fig. 1.

In the drawings 1 designates a combined handle and lifter constructed in accordance with my invention, and comprising the members 2 and 3 and the latch 4.

The member 2 is formed of a metal blank 2 of suitable length, width and thickness, and of a form in outline adapted, when struck up in a die by a press, to form at one end the upper jaw 5, the inverted U shaped neck portion 6 merging and curved into the jaw, the broader and shallower body portion 7 concavo-convex in cross section, and tapering to and integral with a narrower inverted U shape shank portion 8, gradually broadened and flattened and curved at the outer end portion into the lid lifter 9, which is cut through near its junction with the shank and has a portion bent up and formed into a hook 10, adapted to engage the rim of a pan, as shown in Fig. 4. The body portion 7 is cut through to form a longitudinal slot 11 having at the end toward the lifter 9 an enlarged circular terminal 12. The member 3 is of reduced length, and is also formed of a metal blank of suitable length, breadth, and thickness, and of a form in outline adapted when struck up in a suitable die by a press to form at one end a lower jaw 13, an opening 14 to receive the neck portion of the member 3, and ear portions 15 on opposite sides of the opening in the portion next adjacent to the jaw 13, and the body portion 16 curved concavo-convex in cross section to fit over and around the upper face of the body portion 7 of the member 2 and having formed in the end opposite to the jaw 13, the hooks 17 adapted to engage and support the rim of a pan, as shown in Fig. 4.

The ears 15 of the member 3, and the neck portion 6, are pierced in alinement to receive a pivot 18, when the members are assembled together as shown in Figs. 1 and 2, in which position when the body portions 7 and 16 respectively of the members are closed together, as shown in full lines in Fig. 1, the jaws 5 and 13 are substantially parallel and near together at an angle less than a right angle from the body portions 7 and 16 respectively and when the body portions are moved oppositely, either or both, to separate them, the jaws are opened one from the other, as shown in dotted lines in Fig. 1.

The member 3 is provided with a slot 11', which when the members 2 and 3 are closed together, as shown in Figs. 1 and 2, registers with the slot 11 of the member 2, and also extends opposite and over the circular end portion 12 of the slot 11.

In the slot 11' is slidably confined by the button heads 19 and 19', the shank 20, to the opposite ends of which are fixedly attached the heads, the shank and the heads together forming the latch 4. The circular end portion 12 of the slot 11 is of a diameter to permit the button head 19' to pass through it when the shank 20 is moved to the outer end of the slot 11. After the head 19' has passed through the opening 12, the members 2 and 3 are locked together with the jaws in closed position, by sliding the latch 4 forward in the slots 11 and 11'. When the jaws are closed together on opposite sides of the rim of a pan, as shown in Fig. 1, it requires a slight pressure to bring the portions 7 and 16 together to allow the button 19' to pass through the opening 12 after which the button 19 being pushed toward the jaws, the latch 4 locks the members 2 and 3 together and prevents the detachment of the device from the pan, and thus secured it forms a secure handle therefor, by which it may be carried or tilted for pouring liquid therefrom. By sliding the button 19 back over the opening 12 in the member 2, the implement is readily detached from the pan, and in like manner as described, may be attached to any other deep pan, or by opening out the members 2 and 3 as shown in Fig. 4, it may be used for lifting a pie pan, by engaging diametrically opposite portions of the rim with the hooks 10 and 17 respectively. Thus engaged the pie pan and its contents may be securely lifted by either member 2 or 3 or the jaws of both, the weight of the pan operating to more firmly secure its hold on the pan. The device is automatically released from the pan when the pan is deposited on a table or other support. It is therefore apparent that the device is readily and securely attached to deep pans, as a handle, or to shallow pie pans or the like as a lifter, and that its use for either purpose is both convenient and safe. The members 2 and 3 being locked together by the latch 4, it is also adapted for use as a convenient and safe stove lid lifter. It will be seen also that by engaging the bail of a kettle by the hook 10, the device may be used safely and conveniently for lifting the kettle and its contents when heated, from a stove or range.

In Fig. 3 is shown a slightly modified form of embodiment of my invention, 1ª, wherein the shorter member 3ª, having the upper jaw 13ª formed thereon, is hinged to the longer member 2ª having the lower jaw 5ª formed thereon. The member 2ª is provided with an opening 14ª, and with ears 15ª on opposite sides of the opening, between which extends the inverted U shaped neck portion 6ª of the member 3ª, and the two members are pivoted together by the pivot 18ª. The body portion 7ª of the member 2ª is convex on its outer face and concave on its inner face, and the body portion 16ª of the member 3ª is also convex on its upper face and on a circle adapting it to nest within and against the inner face of the portion 7ª of the member 2ª. The free end of the portion 16ª of the member 3ª is provided with the hook 17ª, the point of which is curved toward the member 2ª and extends within the concavity of the inverted U shaped shank portion 8ª of the member 2ª which is of the general form of the shank 8 of the member 2 of the device 1 and has integral therewith a lifter 9ª similar to the lifted 9, excepting that the hook 10ª formed similar to the hook 10 of the device 1 projects oppositely from the lifter 9ª to that of the hook 10 from the lifter 9. The member 2ª is provided with a longitudinally disposed slot 11ª in which is mounted a latch 4, and the member 3ª is provided with a complementary slot 11ª′ having a circular enlargement at its end nearest the hook 17ª, adapted to receive the head 19′ of the latch when the body portions of the members are closed together, and the latch 4 operates in like manner as described to lock the members 3ª and 2ª together when in such position, and when the members are in open position corresponding to the open position of the members 2 and 3 of the device 1, as shown in Fig. 4, the hooks 10ª and 17ª are adapted to oppositely engage the rim of the pipe pan or the like, and when so engaged, adapt the device 1ª to safely and conveniently lift the pan and its contents, and to be automatically disengaged therefrom when the pan is deposited on a table or other support.

From the foregoing it will be seen that the two embodiments of my invention shown and described are substantial equivalents in construction and in functions, and I therefore do not limit myself in the embodiment of my invention to either of said forms.

What I claim to be new is—

1. In a combined pan handle and pan lifter the combination of a pair of complementary pincer members, pivoted one to the other, said members having complementary jaws at one end adapted to engage the rim of a pan when the members are opened and then closed together with the rim between the jaws, complementary concavo-convex handle portions of unequal length adapted to close together one within the other and having complementary hooks at their end portions, the hook of the shorter handle portion adapted to nest with the longer handle portion, and said hooks adapted to engage the rim of a pan at diametrically opposite points when the jaws at the opposite ends of the members are open and used as a handle to lift the pan.

2. A pan handle, comprising a pair of complementary pincer members pivoted one to the other and having complementary jaws adapted to engage the rim of a pan when the members are closed together, and having complementary concavo-convex handle portions adapted to close together one within the other, said handle portions being provided with complementary longitudinal slots, and the slot of one handle portion having an enlargement at one end, and a latch comprising a pair of button heads connected by a shank, said latch having its shank slidably confined in one slot by its heads, and one of the heads being adapted to pass through the enlargement of the slot in the handle portion of the other member, when the members are in closed position.

In testimony whereof I have hereunto set my hand at Toledo, Ohio, this 19th day of May, 1914, in the presence of two subscribing witnesses.

JOHN J. DUKET.

In presence of—
JOHN E. CONNELL,
A. Y. HANSAN.

Copies of this patent may be obtained for five cents each, by addressing the "Commissioner of Patents, Washington, D. C."